May 2, 1939.   W. OESINGHAUS   2,157,006

CURRENT AND VOLTAGE RESPONSIVE APPARATUS

Filed Dec. 18, 1937

Inventor:
Werner Oesinghaus,
by Harry E. Dunham
His Attorney.

UNITED STATES PATENT OFFICE 2,157,006

CURRENT AND VOLTAGE RESPONSIVE APPARATUS

Werner Oesinghaus, Berlin-Treptow, Germany, assignor to General Electric Company, a corporation of New York Application December 18, 1937, Serial No. 180,667
In Germany January 7, 1937

3 Claims. (Cl. 171—95)

My invention relates to current and voltage responsive apparatus and it concerns particularly arrangements for measuring voltage in alternating current circuits.

It is an object of my invention to provide an efficient sensitive apparatus for measuring minute alternating voltage fluctuations.

It is a further object of my invention to provide such apparatus which is independent of the phase relationship and of the wave shape of the voltages to be measured.

It is also an object of my invention to provide such apparatus which is substantially unaffected by temperature changes.

Other and further objects and advantages will become apparent as the description proceeds.

In accordance with my invention in its preferred form, the voltage to be measured is applied to two different circuits having different voltage and current characteristics, the characteristic being very steep in one circuit and relatively flat in the other circuit so that minute variations in the input voltage produce relatively great variations in the current in the two circuits. Voltages proportional to these currents are obtained by resistance drops, rectified and compared in a suitable differential circuit including a current responsive instrument.

Figure 1:
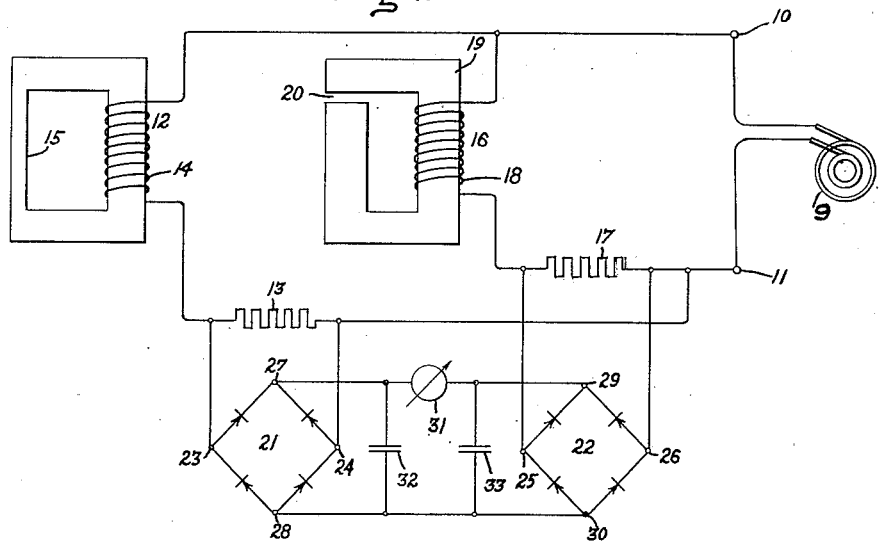
Figure 2:
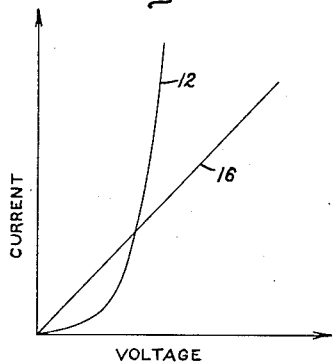

A better understanding of my invention may be obtained from the following detailed description when considered in connection with the accompanying drawing and those features of the invention which are believed to be novel and patentable will be pointed out in the claims appended hereto. In the drawing Fig. 1 is a schematic circuit diagram of one embodiment of my invention. Fig. 2 is a graph illustrating the principle of operation of my invention.

In the arrangement illustrated in the drawing a pair of input terminals 10 and 11 are provided for connection to points in an electrical circuit between which the potential difference or voltage is to be measured for example, across an alternating current source 9. A non-linear circuit of any suitable form such as a saturable reactor 12 is connected to the terminals 11 and 10 in series with a resistor 13. The saturable reactor 12 may consist of a choke coil 14 having an iron core, a portion of which, 15, is of such small cross section as to be saturated readily when voltages are applied within the range of the measurements to be made. A linear circuit is also connected to the terminals 10 and 11 and it may consist of a non-saturable reactor 16 connected in series with a resistor 17 to the terminals 10 and 11. The reactor 16 may consist of a choke coil 18 wound on a magnetic core 19 of relatively large cross section having an air gap 20 therein.

Rectifiers 21 and 22 are connected across the resistors 13 and 17 respectively, each rectifier having input terminals connected across said respective resistors and having output terminals. The rectifiers 21 and 22, may if desired, be of the copper oxide or dry rectifier type connected in the full-wave bridge circuit consisting of four rectifier units each. The terminals 23 and 24 of the rectifier 21 serve as input terminals and are connected across resistor 13; likewise, terminals 25 and 26 of the rectifier 22 serve as input terminals connected across the resistor 17. The output terminals 27 and 28 of the rectifier 21 are connected to the output terminals 29 and 30 of the rectifier 22, and a current responsive instrument 31 is interposed in the connection for the purpose of comparing the voltage drops across the resistors 13 and 17. It will be understood that output terminals of like polarity are connected together. Since the voltage drops across the resistors 13 and 17 are rectified, variations in wave form or phase relationship of these voltages do not affect measurements obtained by the instrument 31. In order to avoid unsteadiness of the pointer of the instrument 31 which might result from high frequency alternations in the relative magnitude of the rectified voltages, smoothing condensers 32 and 33 may be connected to the output terminals of the rectifiers 21 and 22 respectively. Temperature variations do not affect readings for the reason that both circuits are influenced in the same manner by temperature variations.

The principle of operation of the apparatus is shown in Fig. 2 in which the curve 12 shows the relationship between current plotted in a vertical direction, and input voltages plotted in a horizontal direction for the saturable reactor or non-linear impedance 12, and the curve 16 shows the relationship between current and voltage for the non-saturable reactor or linear impedance 16. The voltage drops in the resistors 13 and 17 are, of course, proportional to the currents flowing in the impedances 12 and 16 respectively. It will be seen that a relatively small variation in the input voltage between terminals 10 and 11 produces a relatively great difference in the current and in the voltage drops in the resistors 13 and 17 so that comparison of these voltages by means of the current responsive instrument 31 affords highly sensitive measurements of fluctuations in the voltage between terminals 10 and 11.

The operation of the apparatus is easily brought into the most favorable working range by selection of the number of turns of the choke coils, by altering the cross-section of the saturated core or by altering the air gap of the unsaturated core, as well as by adjusting the series resistors 13 and 17.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. An apparatus responsive to the voltage of alternating current circuits comprising a pair of terminals for connection to points between which voltage is to be determined, a saturable reactor and a resistor connected in series to said terminals, a non-saturable reactor, and a second resistor also connected in series to said terminals, a full-wave rectifier having input terminals connected across said first resistor and having output terminals, a second full-wave rectifier having input terminals connected across said second resistor and having output terminals, a pair of condensers each connected to the output terminals of one of said rectifiers, a current responsive instrument connecting the output terminals of one polarity of said rectifiers, and connections between the output terminals of the other polarity of said rectifiers.

2. An apparatus responsive to the voltage of alternating current electrical circuits, comprising a pair of terminals, a non-linear impedance and a resistor connected in series to said terminals, a linear impedance and a second resistor also connected in series to said terminals, a rectifier having input terminals connected across one of said resistors and having output terminals, a second rectifier having input terminals connected across the other of said resistors and having output terminals, and means including a current responsive device connecting the rectifier output terminals of like polarity together.

3. An apparatus responsive to the voltage of alternating current electrical circuits comprising a pair of terminals, a non-linear impedance connected in a circuit to said terminals, a linear impedance connected in a parallel circuit to said terminals, means for producing rectified voltages proportional to the currents in said circuits, and means responsive to difference in magnitude of said rectified voltages.

WERNER OESINGHAUS.